United States Patent Office 3,672,748
Patented June 27, 1972

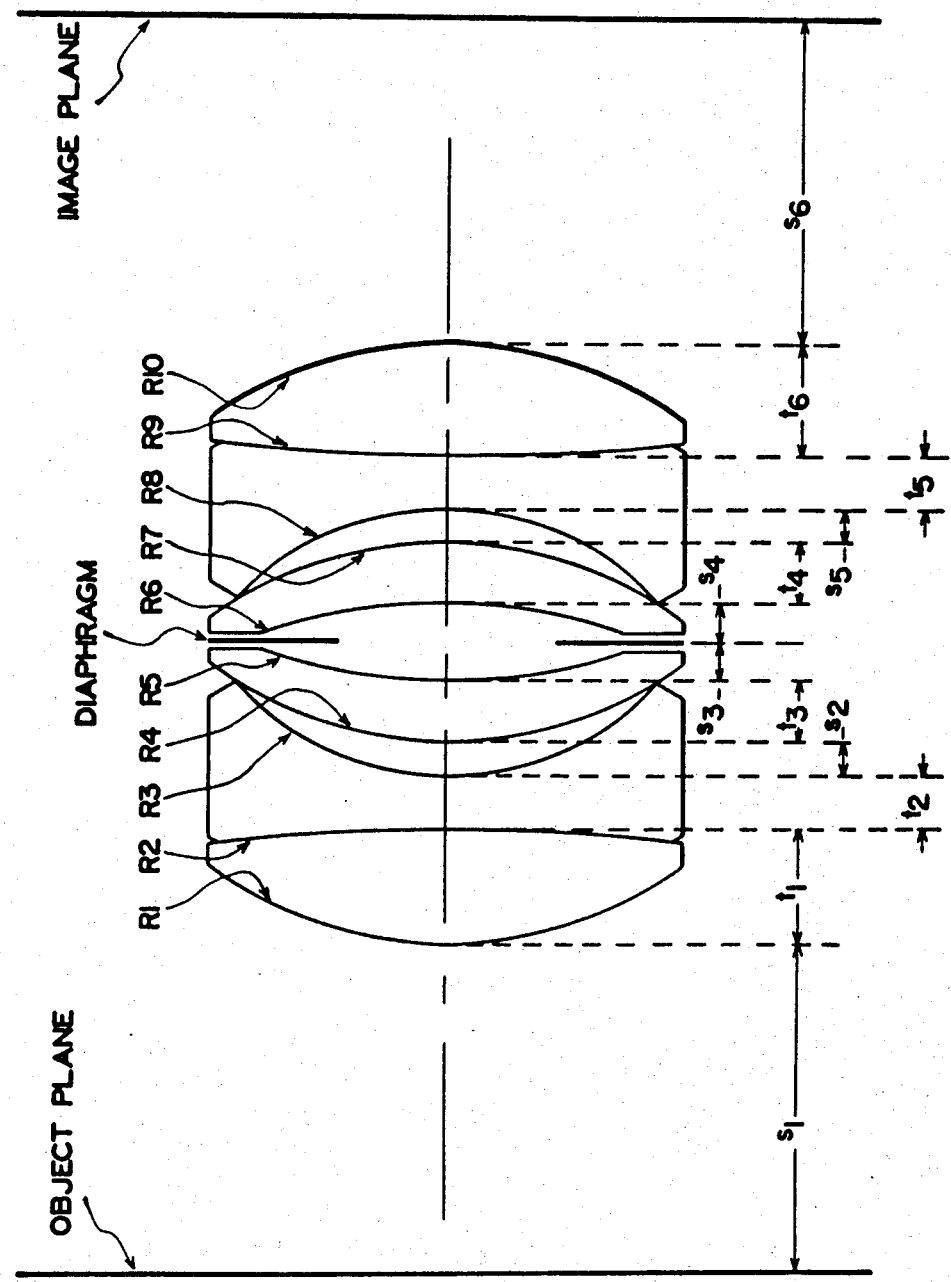

---

3,672,748
SPLIT DAGOR-TYPE OF SYMMETRICAL COPYING LENS SYSTEM
Yoshikazu Doi and Yasuo Honda, Oomiya, Japan, assignors to Xerox Corporation, Stamford, Conn.
Filed May 14, 1971, Ser. No. 143,372
Int. Cl. G02b 9/58
U.S. Cl. 350—220         2 Claims

ABSTRACT OF THE DISCLOSURE

A split Dagor-type of symmetrical copying lens system having front and back compound lens components with a centrally-located diaphragm therebetween adapted to an optical system of a copier which can be used at 1:1 magnification. The front lens component has three lens elements including, in the following order, a first lens element of positive power, a second lens element of negative power cemented to the first lens element and a third lens element of positive power disposed between the second lens element and diaphragm, and the back lens component having three similar lens elements positioned so that the lens system is symmetrical.

BACKGROUND OF THE INVENTION

The present invention relates to split Dagor-type of symmetrical lens system and, more particularly, to a lens system which is particularly suited to a copier optical system.

In reproduction systems wherein light patterns of original information is projected onto a photosensitive member to form a copy of the information on the member, a lens system is required which focuses the light pattern on the member to reproduce sharp, clear images. The characteristics of prior art lens systems for copiers such as the size of field angle that can be tolerated, degree of resolution and other rating factors are to a large extent dependent on the speed, or $f$-number of the lens system. As a general matter, it is known that as the $f$-number decreases, the overall performance of the copier lens system declines noticeably if the field angle remains constant. As a result, the lens system used in the present copiers maintain $f$-numbers in the range of $f(6.3)$ to $f(11.0)$ to assure good resolution at reasonable field angles and over a wide spectral range to form images of adequate quality for the copier environment.

With the advent of more demanding copying systems wherein wavelengths of light throughout the visible spectrum pass through the lens system, another problem involving chromatic aberration called secondary color arises with prior art lens systems. In this situation light rays of different wavelengths in the same ray bundle are displaced a small distance from one another upon reaching the image plane. This displacement causes an obvious depreciation in the image being formed especially when reproducing color originals if the displacement is allowed to reach proportions discernible by the eye.

The lens system disclosed herein maintains high performance characteristics at a field angle in the order of 40° and good color fidelity at speeds as high as $f(5.6)$. In addition, the lens system is adapted to produce high quality images in the copier environment.

Accordingly, it is an object of the present invention to improve the design of split Dagor-type lens systems.

It is a further object of the present invention to improve lens systems employed in copiers.

It is a further object of the present invention to improve the quality of images formed by lens systems which operate at a field angle in the order of 40° and at speeds of $f(5.6)$.

It is a further object of the present invention to improve the quality of color images formed from wavelengths of light between 3900 and 6500 angstroms.

It is a further object of the present invention to improve the quality of images formed by a split Dagor-type lens system at 1:1 magnification.

It is a further object of the present invention to improve the design of a split Dagor-type lens system so that it can be easily manufactured and assembled.

SUMMARY

The invention described herein is a split Dagor-type lens system having front and back compound lens components with a centrally located diaphragm therebetween. The lens system forms high quality images with the field angle of 40° and a speed of $f(5.6)$ at 1:1 magnification and minimizes the effect of secondary color at the image plane.

The front lens component has three lens elements including, in the following order, a first lens element of positive power, and a second lens element of negative power cemented to the first lens element, and a third lens element of positive power disposed between the second lens element and diaphragm, and back lens component having three similar lens elements positioned so that the lens system is symmetrical. In a specific embodiment of the lens, the first lens element in the front component is a double convex lens, the second lens element a double concave lens, and the third lens element a convex-concave lens element.

BRIEF DESCRIPTION OF THE DRAWINGS

For a better understanding of the invention as well as other objects and further features thereof, reference is had to the following detailed description to be used in conjunction with the accompanying drawing wherein:

The figure is a schematic illustration of the invention.

DESCRIPTION OF THE PREFERRED EMBODIMENTS

Referring to the figure, a split Dagor-type lens system is shown between object and image planes. The lens system includes two compound lens components of three lens elements each having a diaphragm located therebetween. The lens system has a front portion between the object lane and diaphragm and a back portion between the diaphragm and image plane, the six lens elements being located so that the entire lens system is symmetrical about the diaphragm.

The front portion of the system includes lens element I which is a positive power lens, lens element II which is a negative power lens, and lens element III which is a positive power lens. Lenses I and II are cemented together with any suitable transparent optical cement such as one of the cements made for this purpose by Eastman Kodak Company, Rochester, New York. Preferably, the cement should have an index of refraction which closely approximates that of lenses I and II. Lens III, the closest one to the diaphragm, is separated from lens II by an air gap.

Any known optical glass can be used which is suitable for the lens system shown. The lens elements in the back portion of the lens system which include lenses IV, V, and VI are of the same general configuration as lenses III, II and I, respectively, arranged in a complementary manner to the front portion of the lens system in order to achieve a symmetrical lens system.

As a result of lens elements I and II and lens elements V and VI being cemented together, the system is simpler to manufacture and assemble with precision that it would be if designed with an air gap between these lens elements. The undesirable build up of tolerance common to lens systems having multiple lens elements separated by air gaps is also less of a problem in the present design, since two air gaps are eliminated.

The figure shows the front portion of the lens system as including lens I which is shown as a double convex lens, lens II which is shown as a double concave lens and lens III which is shown as a convex-concave lens. The specific sizes, shapes, and radii of the individual lens are only shown illustratively in the figure and are not necessarily intended to be presented to scale. For instance, lens I could be a convex-concave lens as long as its power remains positive. Similar changes could be made in the other lens elements of the system and the same is true of the back portion lens elements.

The parameters of the lens system are based on measurements taken on the system as shown in the figure. The symbol "S" generally refers to the length of air spaces between elements in the system and the term "T" refers to thickness of lens elements, both distances being measured in inches along the center line of the lens system. Referring to the figure, $S_1$ is the distance between the object plane and lens element I, $S_2$ the distance between the lens elements II and III, $S_3$ the distance between lens element III and the diaphragm opening, $S_4$ the distance between the diaphragm opening and lens element IV, $S_5$ the distance between the lens element IV and V, and $S_6$ the distance between lens element VI and the image plane. $T_1$ is the thickness of lens element I, $T_2$ the thickness of the lens element II, $T_3$ the thickness of the lens element III, $T_4$ the thickness of lens element IV, $T_5$ the thickness of lens element V and $T_6$ the thickness of lens element VI. In addition, lens element I has radii $R_1$ and $-R_2$, lens element II radial $-R_2$ and $R_3$, lens element III radii $R_4$ and $R_5$, lens element IV radii $-R_6$ and $R_7$, lens element V radii $-R_8$ and $R_9$ and lens element VI radii $R_9$ and $-R_{10}$. In the tables $R_1$ to $-R_{10}$ represent the successive lens surfaces formed on said lens elements wherein the minus (—) sign applies to the curvatures whose centers lie on the short conjugate side of the respective surfaces.

In many prior art copiers, the correction of secondary color is particularly important. When the lens system disclosed herein is used in this type of color copier at 1:1 magnification and an aperture of substantially $f(5.6)$ secondary color effects are reduced, especially in the higher wavelengths, when the values set out in Table I and Chart II are maintained.

All scalar values are given in inches and as a multiple of focal length F.

TABLE I

| | | |
|---|---|---|
| $S_2$ | $=S_5$ | $=.016F$ |
| $S_3$ | $=S_4$ | $=.027F$ |
| $T_1$ | $=T_6$ | $=.053F$ |
| $T_2$ | $=T_5$ | $=.030F$ |
| $T_3$ | $=T_4$ | $=.023F$ |
| $R_1$ | $=-R_{10}$ | $=.250F$ |
| $-R_2$ | $=R_9$ | $=2.917F$ |
| $R_3$ | $=-R_8$ | $=.182F$ |
| $R_4$ | $=-R_7$ | $=.253F$ |
| $R_5$ | $=-R_6$ | $=.369F$ |
| $N_d$ (I) | $=N_d$ (VI) | $=1.658$ |
| $N_d$ (II) | $=N_d$ (V) | $=1.582$ |
| $N_d$ (III) | $=N_d$ (IV) | $=1.623$ |
| $v$ (I) | $=v$ (VI) | $=50.8$ |
| $v$ (II) | $=v$ (V) | $=42.1$ |
| $v$ (III) | $=v$ (IV) | $=57.0$ | and wherein the diameter opening at $f/5.6 = .150F$.

Specific values are given in Chart II.

CHART II

[E.F.L.=10.197, B.F.L.=8.765; $f/5.6$]

| Lens | Radii | Thickness | Spaces | $N_d$ | $v$ |
|---|---|---|---|---|---|
| I | $R_1=2.553$ | | $S_1=18.889$ | | |
| | | $t_1=.541$ | | 1.658 | 50.8 |
| | $-R_2=29.745$ | | | | |
| | | $t_2=.309$ | | 1.582 | 42.1 |
| | $R_3=1.86$ | | $S_2=.167$ | | |
| II | | | | | |
| | $R_4=2.585$ | | | | |
| III | | $t_3=.235$ | | 1.623 | 57.0 |
| | $R_5=3.761$ | | | | |
| | | | $S_3=.281$ | | |
| | | | $S_4=.281$ | | |
| | $-R_6=3.761$ | | | | |
| IV | | $t_4=.235$ | | 1.623 | 57.0 |
| | $-R_7=2.585$ | | | | |
| | | | $S_5=.167$ | | |
| | $-R_8=1.86$ | | | | |
| V | | $t_5=.309$ | | 1.582 | 42.1 |
| | $R_9=29.745$ | | | | |
| | | $t_6=.541$ | | 1.658 | 50.8 |
| | $-R_{10}=2.553$ | | | | |
| | | | $S_6=19.036$ | | | and wherein all scalar values are given in inches.

Although only certain preferred forms of the invention have been shown and described in detail, other forms which are different in precise detail are possible and the values of the optical parameters may be varied within the above-stated limits without departing from the spirit of the invention as defined in the claims appended thereto.

What is claimed is:

1. A symmetrical slot Dagor-type of copying lens system having an aperture of substantially $f(5.6)$ and magnifying the image formed thereby 1:1, said lens system being corrected for spherical aberration and chromatic aberration including secondary color, lateral and longitudinal chromatism, coma, astigmatism, distortion and field curvature, comprising:

(a) a front compound component including lens elements I, II, and III between the optical plane and diaphragm, (b) a back compound component including lens elements IV, V, and VI between the diaphragm and image plane, (c) the two outer lens elements I and VI being of equal positive power and being placed in a symmetrical manner about the diaphragm, the two inner lens elements III and IV being equal positive power and being placed adjacent to the diaphragm in a symmetrical manner about the diaphragm, and lens elements II and V being of equal negative power, lens element II being placed between lens elements I and III and cemented to lens element I and lens element V being placed between lens elements IV and VI and cemented to lens element VI, and (d) the constructional data relating to the lens system having comprehensive values is given in the table herebelow wherein $S_2$ designates the air space between lens element II and III, $S_3$ designates the air space between lens element III and the diaphragm, $S_4$ designates the air space between the diaphragm and lens element IV, and $S_5$ designates the air space between lens elements IV and V, $T_1$ to $T_6$ designates the axial thickness of successive lens elements I to VI, $R_1$ to $R_{10}$ designate radii of the successive lens surface numbering from the first radii in the front component of the lens, the minus (—) sign used with certain R values to define that the surfaces are concave towards incident light, and the refractive index and Abbe number of the glasses in said lens element being designated respectively $N_d$ and $v$:

| | | |
|---|---|---|
| $S_2$ | $=S_5$ | $=.016F$ |
| $S_3$ | $=S_4$ | $=.027F$ |
| $T_1$ | $=T_6$ | $=.053F$ |
| $T_2$ | $=T_5$ | $=.030F$ |
| $T_3$ | $=T_4$ | $=.023F$ |
| $R_1$ | $=-R_{10}$ | $=.250F$ |
| $-R_2$ | $=R_9$ | $=2.917F$ |
| $R_3$ | $=-R_8$ | $=.182F$ |
| $R_4$ | $=-R_7$ | $=.253F$ |
| $R_5$ | $=-R_6$ | $=.369F$ |
| $N_d$ (I) | $=N_d$ (VI) | $=1.658$ |
| $N_d$ (II) | $=N_d$ (V) | $=1.582$ |
| $N_d$ (III) | $=N_d$ (IV) | $=1.623$ |
| $v$ (I) | $=v$ (VI) | $=50.8$ |
| $v$ (II) | $=v$ (V) | $=42.1$ |
| $v$ (III) | $=v$ (IV) | $=57.0$ | and wherein the diameter opening at $f/5.6$ is $0.150F$.

2. The lens system according to claim 1 wherein the lens elements have the following characteristics:

[E.F.L.=10.197, B.F.L.=8.765, $f/5.6$]

| Lens | Radii | Thickness | Spaces | $N_d$ | $v$ |
|---|---|---|---|---|---|
| I | $R_1=2.553$ | $t_1=.541$ | | 1.658 | 50.8 |
| | $-R_2=29.745$ | $t_2=.309$ | $S_2=.167$ | 1.582 | 42.1 |
| II | $R_3=1.86$ | | | | |
| | $R_4=2.585$ | | | | |
| III | $R_5=3.761$ | $t_3=.235$ | | 1.623 | 57.0 |
| | | | $S_3=.281$ | | |
| | | | $S_4=.281$ | | |
| IV | $-R_6=3.761$ | $t_4=.235$ | | 1.623 | 57.0 |
| | $-R_7=2.585$ | | $S_5=.167$ | | |
| | $-R_8=1.86$ | | | | |
| V | $R_9=29.745$ | $t_5=.309$ | | 1.582 | 42.1 |
| | $-R_{10}=2.553$ | $t_6=.541$ | | 1.658 | 50.8 |

References Cited

UNITED STATES PATENTS 3,302,991   2/1967   Bechtold   350—220
3,592,531   7/1971   McCrobie   350—220

JOHN K. CORBIN, Primary Examiner

PO-1050
(5/69)

UNITED STATES PATENT OFFICE
CERTIFICATE OF CORRECTION

Patent No. 3,672,748          Dated June 27, 1972

Inventor(s) Yoshikazu Doi et al

It is certified that error appears in the above-identified patent and that said Letters Patent are hereby corrected as shown below:

Claim 1, column 4, line 46, delete "slot" and insert --split--.

Signed and sealed this 2nd day of January 1973.

(SEAL)
Attest:

EDWARD M. FLETCHER, JR.
Attesting Officer

ROBERT GOTTSCHALK
Commissioner of Patents